United States Patent
Keremane et al.

(10) Patent No.: US 9,760,458 B2
(45) Date of Patent: Sep. 12, 2017

(54) DYNAMIC MIRRORING

(71) Applicant: NetApp Inc., Sunnyvale, CA (US)

(72) Inventors: Hrishikesh Keremane, Sunnyvale, CA (US); Iswarya Ayyappan, Bangalore (IN); Allen Rintoul Keeranchira Joseph, Kerala (IN); Vaiapuri Ramasubramaniam, Banglaore (IN); Jitendra Pratap Singh Chauhan, Banglaore (IN)

(73) Assignee: NetApp, Inc., Sunnyvale, CA (US)

( * ) Notice: Subject to any disclaimer, the term of this patent is extended or adjusted under 35 U.S.C. 154(b) by 116 days.

(21) Appl. No.: 14/800,108

(22) Filed: Jul. 15, 2015

(65) Prior Publication Data
US 2016/0357648 A1    Dec. 8, 2016

(30) Foreign Application Priority Data
Jun. 2, 2015   (IN) ............................ 2773/CHE/2015

(51) Int. Cl.
*G06F 11/00* (2006.01)
*G06F 11/20* (2006.01)

(52) U.S. Cl.
CPC ...... *G06F 11/2069* (2013.01); *G06F 11/2058* (2013.01)

(58) Field of Classification Search
CPC ............. G06F 11/2058; G06F 11/2069; G06F 11/2082
See application file for complete search history.

(56) References Cited

U.S. PATENT DOCUMENTS

| | | | | |
|---|---|---|---|---|
| 7,139,885 B2* | 11/2006 | Yamagami | .......... | G06F 11/2058 707/999.202 |
| 7,363,449 B2* | 4/2008 | Kasiolas | ............... | G06F 3/0605 711/162 |
| 8,151,080 B2* | 4/2012 | Naganuma | ............ | G06F 3/0605 711/170 |
| 9,367,413 B2* | 6/2016 | Sarfare | ............... | G06F 11/2094 |
| 2005/0027892 A1* | 2/2005 | McCabe | ............... | G06F 3/0626 709/253 |
| 2006/0203718 A1 | 9/2006 | Benhase et al. | | |

(Continued)

OTHER PUBLICATIONS

Int. Search Report/Written Opinion cited in PCT Application No. PCT/US2016/029109 dated Oct. 7, 2016, 13 pgs.

*Primary Examiner* — Joseph Kudirka
(74) *Attorney, Agent, or Firm* — Cooper Legal Group, LLC

(57) ABSTRACT

One or more techniques and/or systems are provided for dynamic mirroring. A first storage node and the second storage node within a first storage cluster may locally mirror data between one another based upon a local failover partnership. The first storage node and a third storage node within a second storage cluster may remotely mirror data between one another based upon a primary disaster recovery partnership. If the third storage node fails, then the first storage node may remotely mirror data to a fourth storage node within the second storage cluster based upon an auxiliary disaster recovery partnership. In this way, data loss protection for the first storage node may be improved, such that the fourth storage node provide clients with access to mirrored data from the first storage node in the event the second storage node and/or the third storage node are unavailable when the first storage node fails.

20 Claims, 12 Drawing Sheets

(56) References Cited

U.S. PATENT DOCUMENTS

2012/0089863 A1\* 4/2012 Goto .................. G06F 11/2035
714/4.11
2012/0330898 A1 12/2012 Bk et al.
2014/0047263 A1 2/2014 Coatney et al.

\* cited by examiner

DYNAMIC MIRRORING

BACKGROUND

A storage network environment may comprise one or more storage nodes (e.g., storage controllers) configured to provide clients with access to client data stored within storage devices. For example, a first storage node may provide a client with access to client data stored with a first storage device. Unfortunately, if the first storage node fails or a disaster occurs, then the client may be unable to access the client data. Accordingly, a second storage node may be configured as a failover storage node for the first storage node (e.g., a high availability pairing of storage nodes). Client data within the first storage device and/or a first write cache of the first storage controller may be mirrored (e.g., replicated) to a second storage device and/or a second write cache of a second storage node. Thus, when the first storage node fails or the disaster occurs, the second storage node can provide the client with failover access to mirrored client data within the second storage device.

Storage nodes may be associated with different storage clusters. For example, the first storage node and the second storage node may be located within a first storage cluster. Unfortunately, if the first storage cluster fails, then clients may be unable to access client data provided by storage nodes within the first storage cluster. Accordingly, the first storage node may be paired with a third storage node, within a second storage cluster, as a disaster recovery pairing of storage nodes. Thus, when a disaster occurs at the first storage cluster, the third storage node may provide clients with disaster recovery access to data mirrored from the first storage device and/or the first write cache to a third storage device and/or a third write cache of the third storage node.

DETAILED DESCRIPTION

Figure 1:
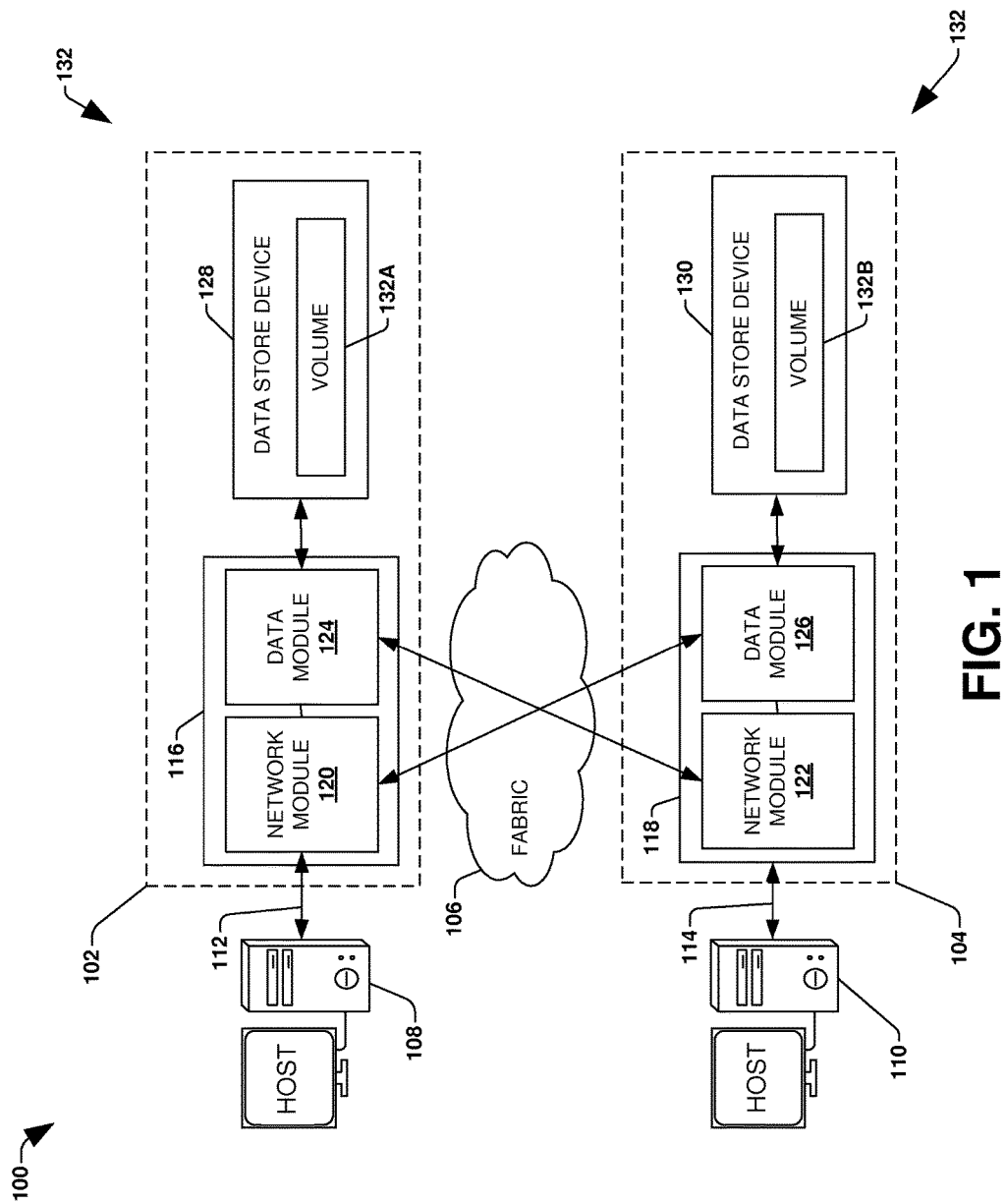
FIG. 1 is a component block diagram illustrating an example clustered network in accordance with one or more of the provisions set forth herein.

Some examples of the claimed subject matter are now described with reference to the drawings, where like reference numerals are generally used to refer to like elements throughout. In the following description, for purposes of explanation, numerous specific details are set forth in order to provide an understanding of the claimed subject matter. It may be evident, however, that the claimed subject matter may be practiced without these specific details. Nothing in this detailed description is admitted as prior art.

One or more systems and/or techniques for dynamic mirroring are provided herein. For example, a first storage cluster may comprise first storage node and a second storage node that have a local failover partnership. The first storage node and the second storage node may locally mirror data between one another based upon the local failover partnership. A second storage cluster may comprise a third storage node and a fourth storage node. The first storage node and the third storage node may remotely mirroring data between one another based upon a primary disaster recovery partnership. If the third storage node fails, then the first storage node may remotely mirror data to the fourth storage node based upon an auxiliary disaster recovery partnership. In this way, data loss protection for the first storage node may be improved, such that the fourth storage node may provide clients with access to mirrored data from the first storage node in the event the second storage node and/or the third storage node fail while the first storage node is unavailable.

To provide context for dynamic mirroring, FIG. 1 illustrates an embodiment of a clustered network environment or a network storage environment 100. It may be appreciated, however, that the techniques, etc. described herein may be implemented within the clustered network environment 100, a non-cluster network environment, and/or a variety of other computing environments, such as a desktop computing environment. That is, the instant disclosure, including the scope of the appended claims, is not meant to be limited to the examples provided herein. It will be appreciated that where the same or similar components, elements, features, items, modules, etc. are illustrated in later figures but were previously discussed with regard to prior figures, that a similar (e.g., redundant) discussion of the same may be omitted when describing the subsequent figures (e.g., for purposes of simplicity and ease of understanding).

FIG. 1 is a block diagram illustrating an example clustered network environment 100 that may implement at least some embodiments of the techniques and/or systems described herein. The example environment 100 comprises data storage systems or storage sites 102 and 104 that are coupled over a cluster fabric 106, such as a computing network embodied as a private Infiniband, Fibre Channel (FC), or Ethernet network facilitating communication between the storage systems 102 and 104 (and one or more modules, component, etc. therein, such as, nodes 116 and 118, for example). It will be appreciated that while two data storage systems 102 and 104 and two nodes 116 and 118 are illustrated in FIG. 1, that any suitable number of such components is contemplated. In an example, nodes 116, 118 comprise storage controllers (e.g., node 116 may comprise a primary or local storage controller and node 118 may comprise a secondary or remote storage controller) that provide client devices, such as host devices 108, 110, with access to data stored within data storage devices 128, 130. Similarly, unless specifically provided otherwise herein, the same is true for other modules, elements, features, items, etc. referenced herein and/or illustrated in the accompanying drawings. That is, a particular number of components, modules, elements, features, items, etc. disclosed herein is not meant to be interpreted in a limiting manner.

It will be further appreciated that clustered networks are not limited to any particular geographic areas and can be clustered locally and/or remotely. Thus, in one embodiment a clustered network can be distributed over a plurality of storage systems and/or nodes located in a plurality of geographic locations; while in another embodiment a clustered network can include data storage systems (e.g., 102, 104) residing in a same geographic location (e.g., in a single onsite rack of data storage devices).

In the illustrated example, one or more host devices 108, 110 which may comprise, for example, client devices, personal computers (PCs), computing devices used for storage (e.g., storage servers), and other computers or peripheral devices (e.g., printers), are coupled to the respective data storage systems 102, 104 by storage network connections 112, 114. Network connection may comprise a local area network (LAN) or wide area network (WAN), for example, that utilizes Network Attached Storage (NAS) protocols, such as a Common Internet File System (CIFS) protocol or a Network File System (NFS) protocol to exchange data packets. Illustratively, the host devices 108, 110 may be general-purpose computers running applications, and may interact with the data storage systems 102, 104 using a client/server model for exchange of information. That is, the host device may request data from the data storage system (e.g., data on a storage device managed by a network storage control configured to process I/O commands issued by the host device for the storage device), and the data storage system may return results of the request to the host device via one or more network connections 112, 114.

The nodes 116, 118 on clustered data storage systems 102, 104 can comprise network or host nodes that are interconnected as a cluster to provide data storage and management services, such as to an enterprise having remote locations, cloud storage (e.g., a storage endpoint may be stored within a data cloud), etc., for example. Such a node in a data storage and management network cluster environment 100 can be a device attached to the network as a connection point, redistribution point or communication endpoint, for example. A node may be capable of sending, receiving, and/or forwarding information over a network communications channel, and could comprise any device that meets any or all of these criteria. One example of a node may be a data storage and management server attached to a network, where the server can comprise a general purpose computer or a computing device particularly configured to operate as a server in a data storage and management system.

In an example, a first cluster of nodes such as the nodes 116, 118 (e.g., a first set of storage controllers configured to provide access to a first storage aggregate comprising a first logical grouping of one or more storage devices) may be located on a first storage site. A second cluster of nodes, not illustrated, may be located at a second storage site (e.g., a second set of storage controllers configured to provide access to a second storage aggregate comprising a second logical grouping of one or more storage devices). The first cluster of nodes and the second cluster of nodes may be configured according to a disaster recovery configuration where a surviving cluster of nodes provides switchover access to storage devices of a disaster cluster of nodes in the event a disaster occurs at a disaster storage site comprising the disaster cluster of nodes (e.g., the first cluster of nodes provides client devices with switchover data access to storage devices of the second storage aggregate in the event a disaster occurs at the second storage site).

As illustrated in the exemplary environment 100, nodes 116, 118 can comprise various functional components that coordinate to provide distributed storage architecture for the cluster. For example, the nodes can comprise a network module 120, 122 and a data module 124, 126. Network modules 120, 122 can be configured to allow the nodes 116, 118 (e.g., network storage controllers) to connect with host devices 108, 110 over the network connections 112, 114, for example, allowing the host devices 108, 110 to access data stored in the distributed storage system. Further, the network modules 120, 122 can provide connections with one or more other components through the cluster fabric 106. For example, in FIG. 1, a first network module 120 of first node 116 can access a second data storage device 130 by sending a request through a second data module 126 of a second node 118.

Data modules 124, 126 can be configured to connect one or more data storage devices 128, 130, such as disks or arrays of disks, flash memory, or some other form of data storage, to the nodes 116, 118. The nodes 116, 118 can be interconnected by the cluster fabric 106, for example, allowing respective nodes in the cluster to access data on data storage devices 128, 130 connected to different nodes in the cluster. Often, data modules 124, 126 communicate with the data storage devices 128, 130 according to a storage area network (SAN) protocol, such as Small Computer System Interface (SCSI) or Fiber Channel Protocol (FCP), for example. Thus, as seen from an operating system on a node 116, 118, the data storage devices 128, 130 can appear as locally attached to the operating system. In this manner, different nodes 116, 118, etc. may access data blocks through the operating system, rather than expressly requesting abstract files.

It should be appreciated that, while the example embodiment 100 illustrates an equal number of network and data modules, other embodiments may comprise a differing number of these modules. For example, there may be a plurality of network and data modules interconnected in a cluster that does not have a one-to-one correspondence between the network and data modules. That is, different nodes can have a different number of network and data modules, and the same node can have a different number of network modules than data modules.

Further, a host device 108, 110 can be networked with the nodes 116, 118 in the cluster, over the networking connections 112, 114. As an example, respective host devices 108, 110 that are networked to a cluster may request services (e.g., exchanging of information in the form of data packets) of a node 116, 118 in the cluster, and the node 116, 118 can return results of the requested services to the host devices 108, 110. In one embodiment, the host devices 108, 110 can exchange information with the network modules 120, 122 residing in the nodes (e.g., network hosts) 116, 118 in the data storage systems 102, 104.

In one embodiment, the data storage devices 128, 130 comprise volumes 132, which is an implementation of storage of information onto disk drives or disk arrays or other storage (e.g., flash) as a file-system for data, for example. Volumes can span a portion of a disk, a collection of disks, or portions of disks, for example, and typically define an overall logical arrangement of file storage on disk space in the storage system. In one embodiment a volume can comprise stored data as one or more files that reside in a hierarchical directory structure within the volume.

Volumes are typically configured in formats that may be associated with particular storage systems, and respective volume formats typically comprise features that provide functionality to the volumes, such as providing an ability for volumes to form clusters. For example, where a first storage system may utilize a first format for their volumes, a second storage system may utilize a second format for their volumes.

In the example environment 100, the host devices 108, 110 can utilize the data storage systems 102, 104 to store and retrieve data from the volumes 132. In this embodiment, for example, the host device 108 can send data packets to the network module 120 in the node 116 within data storage system 102. The node 116 can forward the data to the data storage device 128 using the data module 124, where the data storage device 128 comprises volume 132A. In this way, in this example, the host device can access the storage volume 132A, to store and/or retrieve data, using the data storage system 102 connected by the network connection 112. Further, in this embodiment, the host device 110 can exchange data with the network module 122 in the host 118 within the data storage system 104 (e.g., which may be remote from the data storage system 102). The host 118 can forward the data to the data storage device 130 using the data module 126, thereby accessing volume 132B associated with the data storage device 130.

It may be appreciated that dynamic mirroring may be implemented within the clustered network environment 100. For example, a mirroring component may be hosted within node 116 and/or node 118. The mirroring component may mirror data (e.g., data within a write cache such as a non-volatile random access memory (NVRAM) of a node) between the node 116 and the node 118 based upon a type of partnership between the node 116 and the node 118, such as a local failover partnership, a primary disaster recovery partnership, or an auxiliary disaster recovery partnership.

Figure 2:
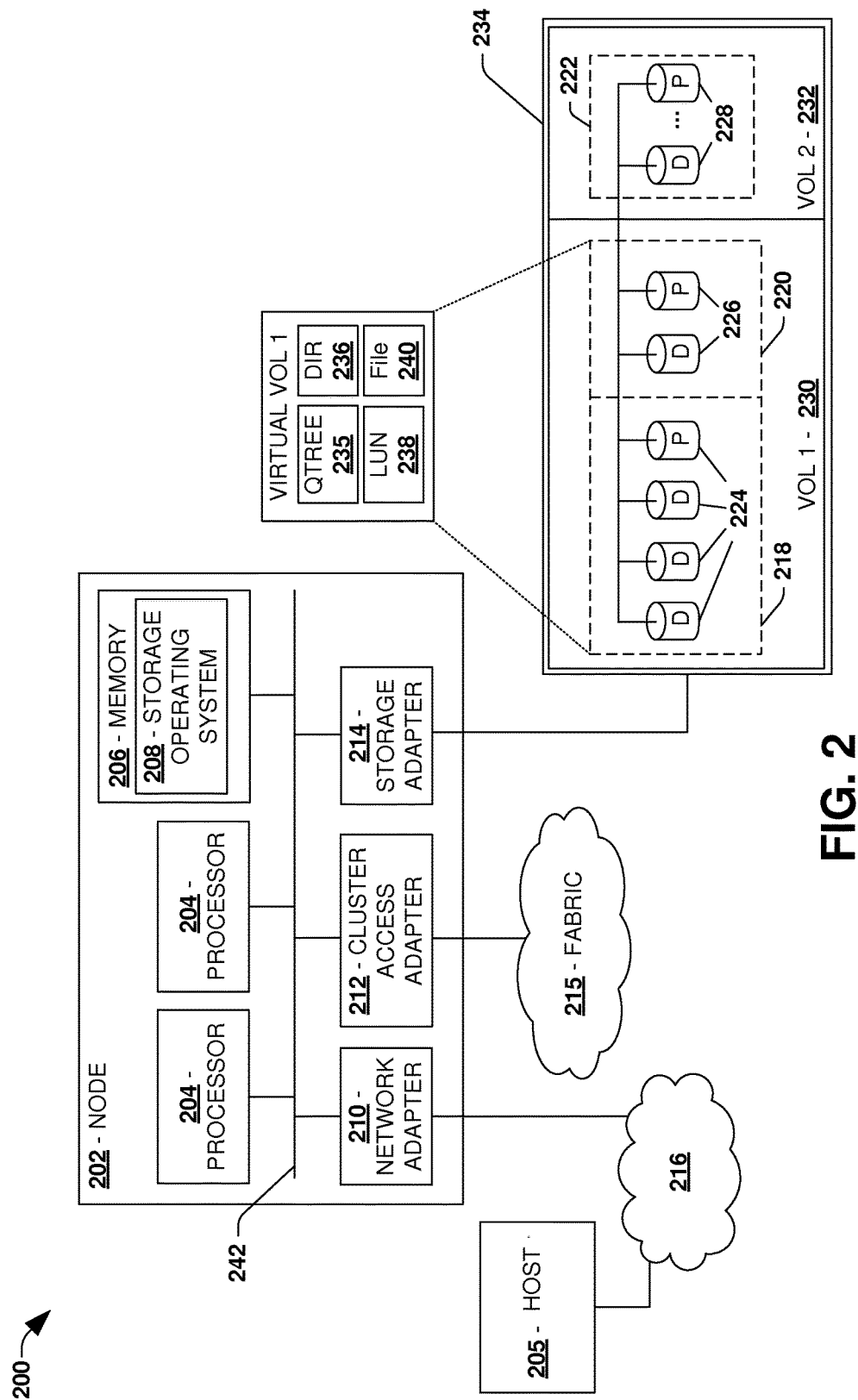
FIG. 2 is a component block diagram illustrating an example data storage system in accordance with one or more of the provisions set forth herein.

FIG. 2 is an illustrative example of a data storage system 200 (e.g., 102, 104 in FIG. 1), providing further detail of an embodiment of components that may implement one or more of the techniques and/or systems described herein. The example data storage system 200 comprises a node 202 (e.g., host nodes 116, 118 in FIG. 1), and a data storage device 234 (e.g., data storage devices 128, 130 in FIG. 1). The node 202 may be a general purpose computer, for example, or some other computing device particularly configured to operate as a storage server. A host device 205 (e.g., 108, 110 in FIG. 1) can be connected to the node 202 over a network 216, for example, to provides access to files and/or other data stored on the data storage device 234. In an example, the node 202 comprises a storage controller that provides client devices, such as the host device 205, with access to data stored within data storage device 234.

The data storage device 234 can comprise mass storage devices, such as disks 224, 226, 228 of a disk array 218, 220, 222. It will be appreciated that the techniques and systems, described herein, are not limited by the example embodiment. For example, disks 224, 226, 228 may comprise any type of mass storage devices, including but not limited to magnetic disk drives, flash memory, and any other similar media adapted to store information, including, for example, data (D) and/or parity (P) information.

The node 202 comprises one or more processors 204, a memory 206, a network adapter 210, a cluster access adapter 212, and a storage adapter 214 interconnected by a system bus 242. The storage system 200 also includes an operating system 208 installed in the memory 206 of the node 202 that can, for example, implement a Redundant Array of Independent (or Inexpensive) Disks (RAID) optimization technique to optimize a reconstruction process of data of a failed disk in an array.

The operating system 208 can also manage communications for the data storage system, and communications between other data storage systems that may be in a clustered network, such as attached to a cluster fabric 215 (e.g., 106 in FIG. 1). Thus, the node 202, such as a network storage controller, can respond to host device requests to manage data on the data storage device 234 (e.g., or additional clustered devices) in accordance with these host device requests. The operating system 208 can often establish one or more file systems on the data storage system 200, where a file system can include software code and data structures that implement a persistent hierarchical namespace of files and directories, for example. As an example, when a new data storage device (not shown) is added to a clustered network system, the operating system 208 is informed where, in an existing directory tree, new files associated with the new data storage device are to be stored. This is often referred to as "mounting" a file system.

In the example data storage system 200, memory 206 can include storage locations that are addressable by the processors 204 and adapters 210, 212, 214 for storing related software program code and data structures. The processors 204 and adapters 210, 212, 214 may, for example, include processing elements and/or logic circuitry configured to execute the software code and manipulate the data structures. The operating system 208, portions of which are typically resident in the memory 206 and executed by the processing elements, functionally organizes the storage system by, among other things, invoking storage operations in support of a file service implemented by the storage system. It will be apparent to those skilled in the art that other processing and memory mechanisms, including various computer readable media, may be used for storing and/or executing program instructions pertaining to the techniques described herein. For example, the operating system can also utilize one or more control files (not shown) to aid in the provisioning of virtual machines.

The network adapter 210 includes the mechanical, electrical and signaling circuitry needed to connect the data storage system 200 to a host device 205 over a computer network 216, which may comprise, among other things, a point-to-point connection or a shared medium, such as a local area network. The host device 205 (e.g., 108, 110 of FIG. 1) may be a general-purpose computer configured to execute applications. As described above, the host device 205 may interact with the data storage system 200 in accordance with a client/host model of information delivery.

The storage adapter 214 cooperates with the operating system 208 executing on the node 202 to access information requested by the host device 205 (e.g., access data on a storage device managed by a network storage controller). The information may be stored on any type of attached array of writeable media such as magnetic disk drives, flash memory, and/or any other similar media adapted to store information. In the example data storage system 200, the information can be stored in data blocks on the disks 224, 226, 228. The storage adapter 214 can include input/output (I/O) interface circuitry that couples to the disks over an I/O interconnect arrangement, such as a storage area network (SAN) protocol (e.g., Small Computer System Interface (SCSI), iSCSI, hyperSCSI, Fiber Channel Protocol (FCP)). The information is retrieved by the storage adapter 214 and, if necessary, processed by the one or more processors 204 (or the storage adapter 214 itself) prior to being forwarded over the system bus 242 to the network adapter 210 (and/or the cluster access adapter 212 if sending to another node in the cluster) where the information is formatted into a data packet and returned to the host device 205 over the network connection 216 (and/or returned to another node attached to the cluster over the cluster fabric 215).

In one embodiment, storage of information on arrays 218, 220, 222 can be implemented as one or more storage "volumes" 230, 232 that are comprised of a cluster of disks 224, 226, 228 defining an overall logical arrangement of disk space. The disks 224, 226, 228 that comprise one or more volumes are typically organized as one or more groups of RAIDs. As an example, volume 230 comprises an aggregate of disk arrays 218 and 220, which comprise the cluster of disks 224 and 226.

In one embodiment, to facilitate access to disks 224, 226, 228, the operating system 208 may implement a file system (e.g., write anywhere file system) that logically organizes the information as a hierarchical structure of directories and files on the disks. In this embodiment, respective files may be implemented as a set of disk blocks configured to store information, whereas directories may be implemented as specially formatted files in which information about other files and directories are stored.

Whatever the underlying physical configuration within this data storage system 200, data can be stored as files within physical and/or virtual volumes, which can be associated with respective volume identifiers, such as file system identifiers (FSIDs), which can be 32-bits in length in one example.

A physical volume corresponds to at least a portion of physical storage devices whose address, addressable space, location, etc. doesn't change, such as at least some of one or more data storage devices 234 (e.g., a Redundant Array of Independent (or Inexpensive) Disks (RAID system)). Typically the location of the physical volume doesn't change in that the (range of) address(es) used to access it generally remains constant.

A virtual volume, in contrast, is stored over an aggregate of disparate portions of different physical storage devices. The virtual volume may be a collection of different available portions of different physical storage device locations, such as some available space from each of the disks 224, 226, and/or 228. It will be appreciated that since a virtual volume is not "tied" to any one particular storage device, a virtual volume can be said to include a layer of abstraction or virtualization, which allows it to be resized and/or flexible in some regards.

Further, a virtual volume can include one or more logical unit numbers (LUNs) 238, directories 236, qtrees 235, and files 240. Among other things, these features, but more particularly LUNS, allow the disparate memory locations within which data is stored to be identified, for example, and grouped as data storage unit. As such, the LUNs 238 may be characterized as constituting a virtual disk or drive upon which data within the virtual volume is stored within the aggregate. For example, LUNs are often referred to as virtual drives, such that they emulate a hard drive from a general purpose computer, while they actually comprise data blocks stored in various parts of a volume.

In one embodiment, one or more data storage devices 234 can have one or more physical ports, wherein each physical port can be assigned a target address (e.g., SCSI target address). To represent respective volumes stored on a data storage device, a target address on the data storage device can be used to identify one or more LUNs 238. Thus, for example, when the node 202 connects to a volume 230, 232 through the storage adapter 214, a connection between the node 202 and the one or more LUNs 238 underlying the volume is created.

In one embodiment, respective target addresses can identify multiple LUNs, such that a target address can represent multiple volumes. The I/O interface, which can be implemented as circuitry and/or software in the storage adapter 214 or as executable code residing in memory 206 and executed by the processors 204, for example, can connect to volume 230 by using one or more addresses that identify the LUNs 238.

It may be appreciated that dynamic mirroring may be implemented for the data storage system 200. For example, a mirroring component may be hosted within node 202. The mirroring component may mirror data (e.g., data within a write cache such as an NVRAM of a node) between the node 202 and another node based upon a type of partnership between the node 202 and the other node, such as a local failover partnership, a primary disaster recovery partnership, or an auxiliary disaster recovery partnership.

FIGS. 3A-3H illustrate examples of a system 300, comprising a mirroring component 301, for dynamic mirroring of data between write caches (e.g., NVRAMs) of storage nodes. A cluster (A) 302 may comprise a storage node (A1) 306 and a storage node (A2) 316 that have a local failover partnership with one another. A cluster (B) 304 may comprise a storage node (B1) 326 and a storage node (B2) 336 that have a local failover partnership with one another. The storage node (A1) 306 may have a primary disaster recovery partnership with the storage node (B1) 326. The storage node (A2) 316 may have a primary disaster recovery partnership with the storage node (B2) 336. The storage node (A1) 306 may have an auxiliary disaster recovery partnership with the storage node (B2) 336. The storage node (A2) 316 may have an auxiliary disaster recovery partnership with the storage node (B1) 326.

The mirroring component 301 may maintain a local write cache partition 308 for caching local I/O operation cache data processed by the storage node (A1) 306 (e.g., the storage node (A1) 306 may locally cache data associated with I/O operations performed by clients through the storage node (A1) 306 for storage devices managed by the storage node (A1) 306). Similarly, the storage node (A2) 316 may locally cache local I/O operation cache data within a second local write cache partition 318. The storage node (B1) 326 may locally cache local I/O operation cache data within a third local write cache 328. The storage node (B2) 336 may locally cache local I/O operation cache data within a fourth local write cache 338. In an example, mirroring components may be implemented within the storage node (A2) 316, the storage node (B1) 326, the storage node (B2) 336, and/or other storage nodes for mirroring write cache data within a cluster and/or across clusters.

Figure 3A:
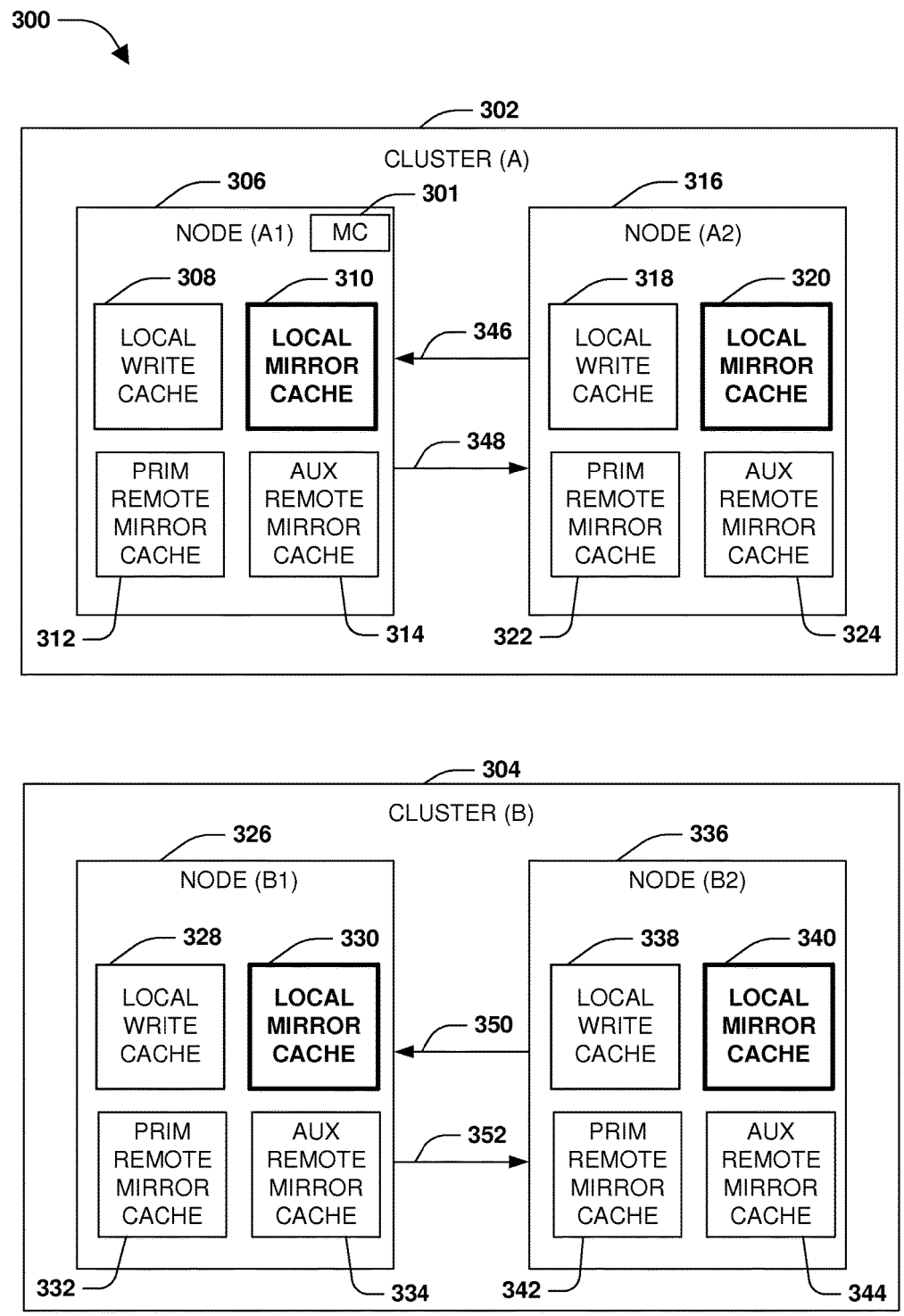
FIG. 3A is an example of a system for dynamic mirroring, where storage nodes mirror data based upon local failover partnerships.

FIG. 3A illustrates the mirroring component 301 maintaining a local mirroring write cache partition 310, at the storage node (A1) 306, for storing local mirrored data from the storage node (A2) 316 (e.g., data within the second local write cache partition 318 may be mirrored into the local mirroring write cache partition 310) based upon the local failover partnership between the storage node (A1) 306 and the storage node (A2) 316 (e.g., the storage node (A1) 306 may provide failover access to data previously managed the storage node (A2) 316 in the event the storage node (A2) 316 fails, such that the local mirrored data within the local mirroring write cache partition 310 is used by the storage node (A1) 306 to provide clients with up-to-date data that was previously cached by the storage node (A2) 316). In this way, data is locally mirrored 346 (e.g., data within the second local write cache partition 318 may be mirrored into the local mirroring write cache partition 310), 348 (e.g., data within the local write cache partition 308 may be mirrored into a second local mirroring write cache partition 320 of the storage node (A2) 316) into local mirroring write cache partitions 310, 320 of the storage node (A1) 306 and the storage node (A2) 316 based upon the local failover partnership between the storage node (A1) 306 and the storage node (A2) 316. Similarly, data may be locally mirrored 350, 352 into local mirroring write cache partitions 330, 340 of the storage node (B1) 326 and the storage node (B2) 336 based upon local failover partnership between the storage node (B1) 326 and the storage node (B2) 336.

Figure 3B:
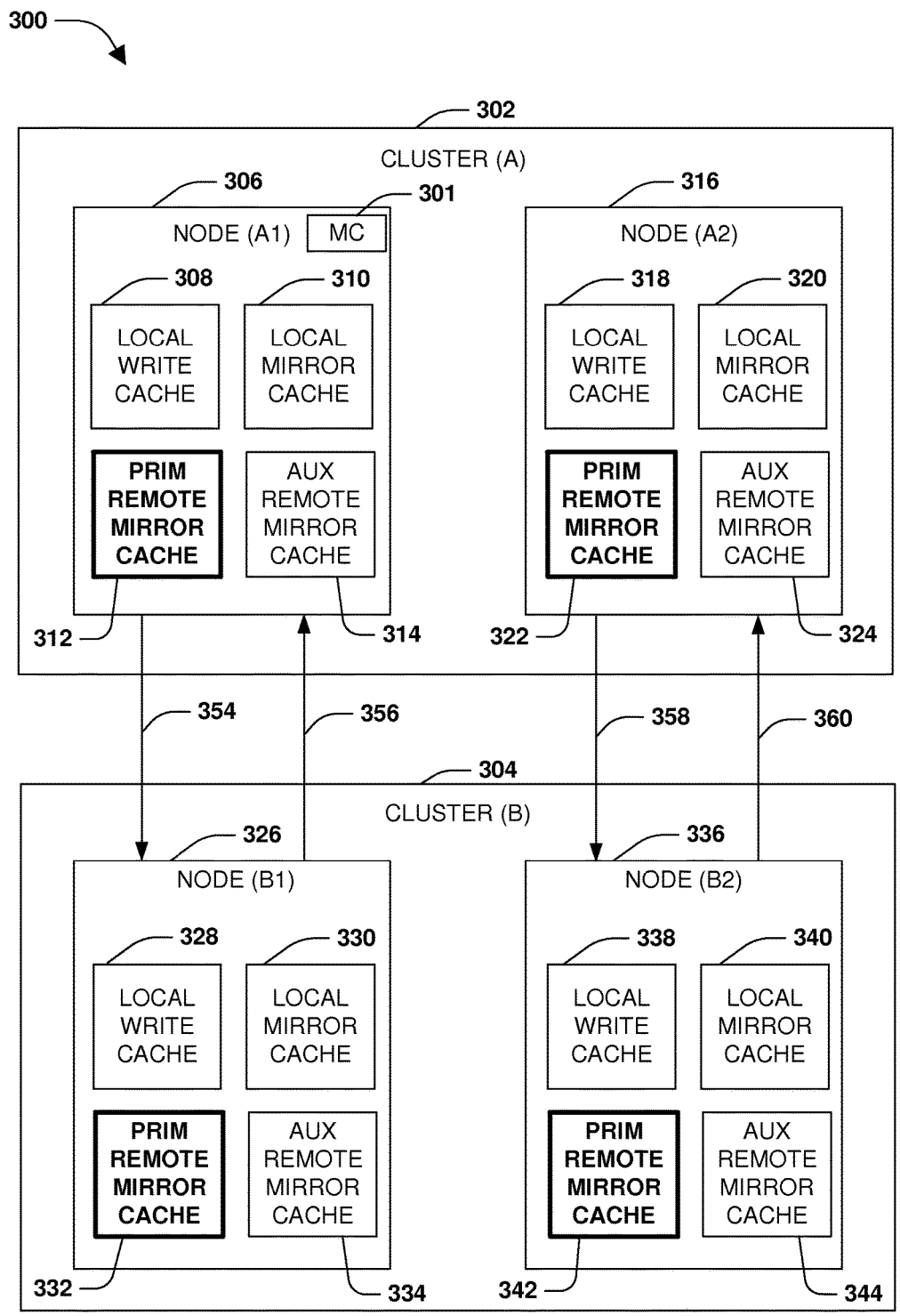
FIG. 3B is an example of a system for dynamic mirroring, where storage nodes mirror data based upon primary disaster recovery partnerships.

FIG. 3B illustrates the mirroring component 301 maintaining a primary remote mirroring write cache partition 312 for storing primary mirrored data from the storage node (B1) 326 (e.g., data within the third local write cache partition 328) based upon the primary disaster recovery partnership between the storage node (A1) 306 and the storage node (B1) 326 (e.g., the storage node (A1) 306 may provide disaster recovery access to data in the event the storage cluster (B) 304, such as the storage node (B1) 326, has a disaster, such that the primary mirrored data within the primary remote mirroring write cache partition 312 may be used by the storage node (A1) 306 to provide clients with up-to-date data that was previously cached by the storage node (B1) 326). In this way, data is remotely mirrored 354 (e.g., data within the local write cache partition 308 may be mirrored into a third primary remote mirroring write cache partition 332 of the storage node (B1) 326), 356 (e.g., data within the third local write cache partition 328 may be mirrored into the primary remote mirroring write cache partition 312) between the storage node (A1) 306 and the storage node (B1) 326 based upon the primary disaster recovery partnership between the storage node (A1) 306 and the storage node (B1) 326. Similarly, data may be remotely mirrored 358 (e.g., data within the second local write cache partition 318 may be mirrored into a fourth primary remote mirroring cache partition 342), 360 (e.g., data within the fourth local write cache partition 338 may be mirrored into a second primary remote mirroring cache partition 322) into primary remote mirroring cache partitions 322, 342 of the storage node (A2) 316 and the storage node (B2) 336 based upon the primary disaster recovery partnership between the storage node (A2) 316 and the storage node (B2) 336.

The mirroring component 301 may maintain an auxiliary remote mirroring write cache partition 314 for storing auxiliary mirrored data from the storage node (B2) 336 (e.g., data within the fourth local write cache partition 338) based upon the auxiliary disaster recovery partnership between the storage node (A1) 306 and the storage node (B2) 336 (e.g., the storage node (A1) 306 may provide disaster recovery access to data in the event the storage cluster (B) 304, such as the storage node (B1) 326 and the storage node (B2) 336, has a disaster, such that the auxiliary mirrored data within the auxiliary remote mirroring write cache partition 314 may be used by the storage node (A1) 306 to provide clients with up-to-date data that was previously cached by the storage node (B2) 336). In an example where storage node (A2) 316 successfully reboots after a disaster at storage cluster (B) 304, storage node (A1) 306 may copy mirrored data from storage node (B2) 336 to storage node (A2) 316 so that storage node (A2) 316 may serve data from storage node (B2) 336, which may improve load balancing. In this way, a mirroring component, such as the mirroring component 301, may dynamically mirror (e.g., into the auxiliary remote mirroring write cache partition 314 in response to the storage node (A2) 316 failing as the primary disaster recovery partner for the storage node (B2) 336; into a fourth auxiliary remote mirroring write cache partition 344 of the storage node (B2) 336 where the storage node (B1) 326 fails as the primary disaster recovery partner for the storage node (A1) 306) between the storage node (A1) 306 and the storage node (B2) 336 based upon the auxiliary disaster recovery partnership between the storage node (A1) 306 and the storage node (B2) 336, such as in response to a failure of a primary disaster recovery partner (e.g., if storage node (B1) 326 fails, then the storage node (A1) 306 may mirror data (e.g., data within the local write cache partition 308) into the fourth auxiliary remote mirroring write cache partition 344 of the storage node (B2) 336). Similarly, data may be dynamically mirrored into auxiliary remote mirroring write cache partitions of other nodes based upon auxiliary disaster recovery partnerships (e.g., from the storage node (B1) 326 into a second auxiliary remote mirroring write cache partition 324 when the storage node (A1) 306 fails as the primary disaster recovery partner for the storage node (B1) 326; from the storage node (A2) 316 into a third auxiliary remote mirroring write cache partition 334 of the storage node (B1) 326 where the storage node (B2) 336 fails as the primary disaster recovery partner for the storage node (A2) 316).

While the storage node (A1) 306, the storage node (A2) 316, the storage node (B1) 326, and the storage node (B2) 336 are operating in a steady operational state (e.g., without a failure or disaster), the mirroring component 301 may actively store the local I/O operation data within the local write cache partition 308. The mirroring component 301 may actively store the local mirrored data (e.g., data within the second local write cache partition 318), from the storage node (A2) 316, into the local mirroring write cache partition 310. The mirroring component 301 may actively store the primary mirrored data, from the storage node (B1) 326, into the primary remote mirroring write cache partition 312. The mirroring component 301 may passively maintain the auxiliary remote mirroring write cache partition 314, which may, for example, be dormant (e.g., or allocated for a different purpose than auxiliary remote caching of data from the storage node (B2) 336) until the storage node (A2) 316 fails as the primary disaster recovery partner for the storage node (B2) 336 (e.g., upon failure of the storage node (A2) 316, the storage node (B2) 336 may remotely mirror data into the auxiliary remote mirroring write cache partition 314). In this way, while the storage nodes are operational, a storage node may have two incoming sets of mirrored data (e.g., a first mirroring of data from a local failover partner that takes ownership of a local mirroring write cache partition and a second mirroring of data from a primary disaster recovery partner that takes ownership of a primary remote mirroring cache partition), which may provide double fault tolerance and/or relatively efficient failover in the event merely a single storage node fails because a local failover partner may quickly take over.

The mirroring component 301 may locally mirror write caching data (e.g., from the local write cache partition 308 of the storage node (A1) 306) to the second local mirroring write cache partition 320 of the storage node (A2) 316 based upon the local failover partnership. The mirroring component 301 may remotely mirror write caching data (e.g., from the local write cache partition 308 of the storage node (A1) 306) to the third primary remote mirroring write cache partition 332 of the storage node (B1) 326 based upon the primary disaster recovery partnership.

Figure 3C:
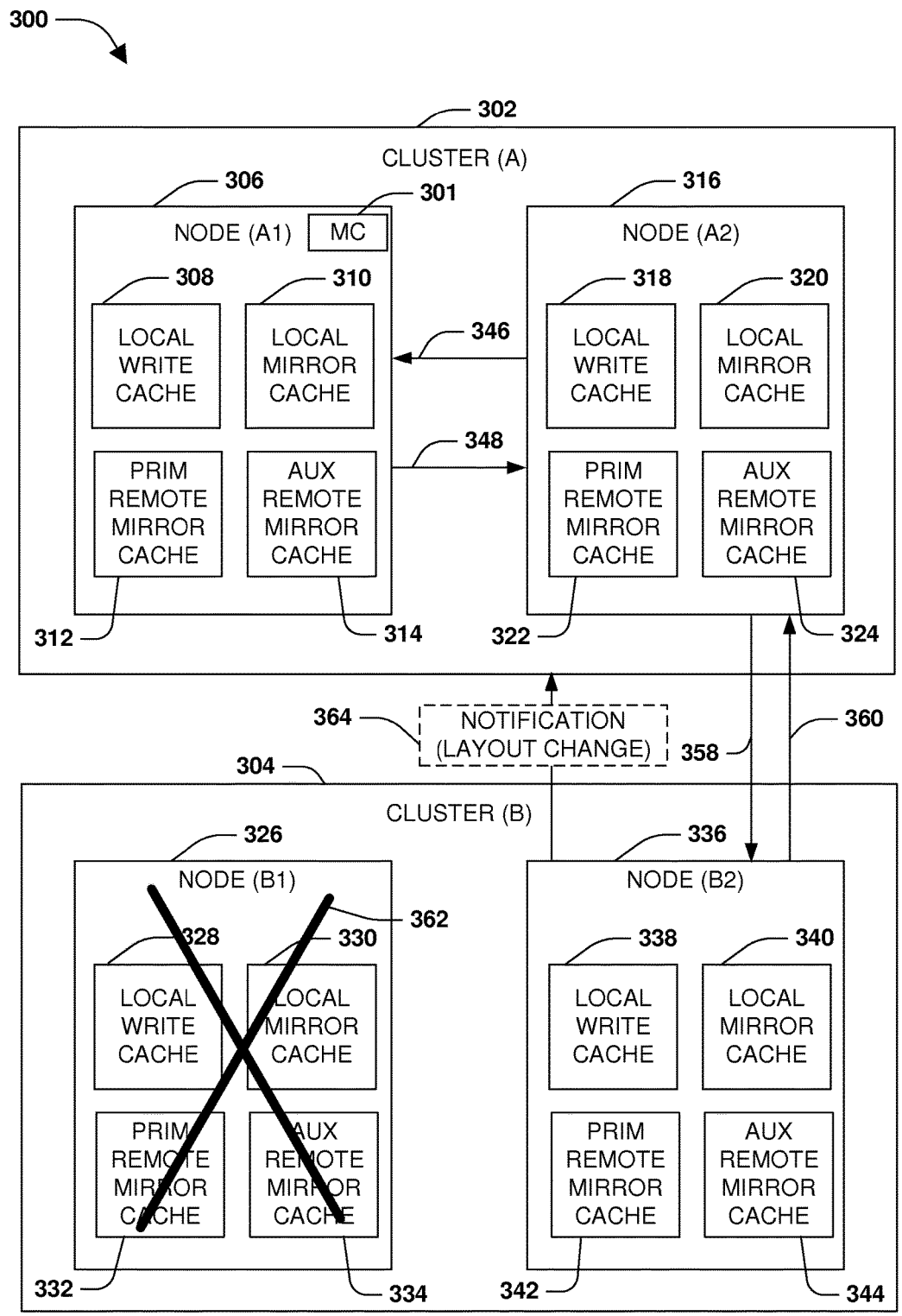
FIG. 3C is an example of a system for dynamic mirroring, where a storage node fails.

FIG. 3C illustrates the storage node (B1) 326 failing 362, and thus being unavailable as a primary disaster recovery partner for the storage node (A1) 306 and as a local failover partner for the storage node (B2) 336. The storage node (B2) 336, as the local failover partner, may determine that the storage node (B1) 326 has failed 362. The storage node (A1) 306 and/or storage node (A2) 316 may receive a notification 364 (e.g., a write cache layout change by the storage node (B2) 336 to adjust for the failure 362 of the storage node (B1) 326) from the storage node (B2) 336 that the storage node (B1) 326 has failed 362.

Figure 3D:
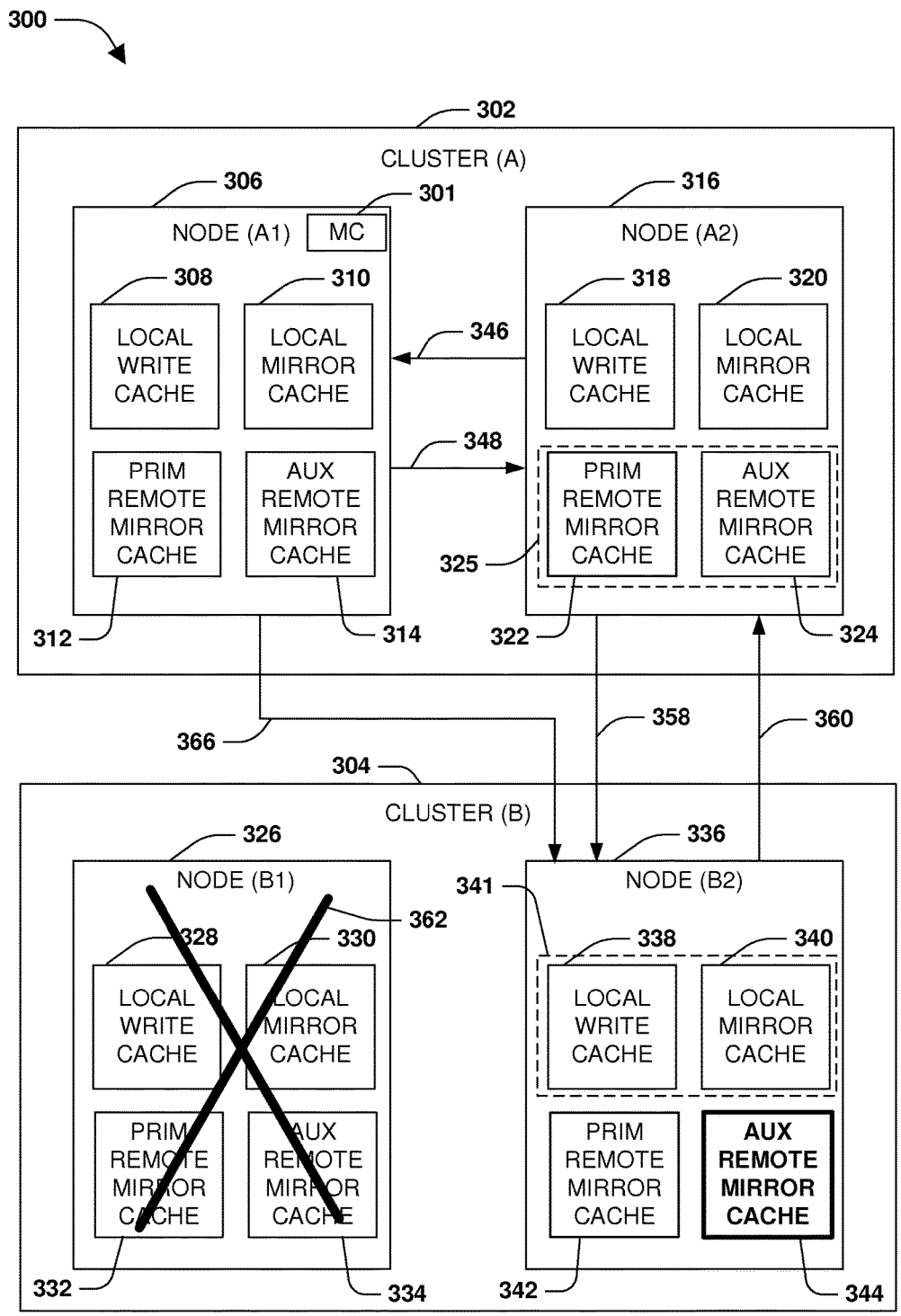
FIG. 3D is an example of a system for dynamic mirroring, where a storage node establishes an auxiliary mirroring logical pipeline with an auxiliary disaster recovery storage node.

FIG. 3D illustrates the mirroring component 301 establishing an auxiliary mirroring logical pipeline 366 between the storage node (A1) 306 and the storage node (B2) 336 based upon the auxiliary disaster recovery partnership between the storage node (A1) 306 and the storage node (B2) 336. In an example, the fourth local write cache partition 338 and the fourth local mirroring write cache partition 340 may be collapsed into a first collapsed partition 341 (e.g., a write cache layout change). In an example, the second primary remote mirroring cache partition 322 and the second auxiliary remote mirroring write cache partition 324 may be collapsed into a second collapsed partition 325 (e.g., a write cache layout change). Collapsing write cache partitions may improve performance, such as improved storage utilization. Because the storage node (A1) 306 is unable to remotely mirror write cache data (e.g., primary mirrored data) to the storage node (B1) 326 as the primary disaster recovery partner, the mirroring component 301 may mirror, over the auxiliary mirroring logical pipeline 366, write caching data from the storage node (A1) 306 (e.g., from the local write cache partition 308 of the storage node (A1) 306) to the fourth auxiliary remote mirroring write cache partition 344 of the storage node (B2) 336 as auxiliary mirrored data. Thus, if storage node (A1) 306 and storage node (A2) 316 fail, storage node (B2) 336 may comprise up-to-date information used to provide client with access to data previously stored by the storage node (A1) 306 (e.g., using the auxiliary mirrored data within the fourth auxiliary remote mirroring write cache partition 344) and/or data mirrored from other storage nodes. Because the storage node (B2) 336 may be configured as a failover partner for the storage node (B1) 326, the storage node (B2) 336 may use the fourth local mirroring write cache partition 340 for providing clients with up-to-date failover access to data (e.g., local mirrored data that was mirrored from the storage node (B1) 326) previously stored by the storage node (B1) 326.

Figure 3E:
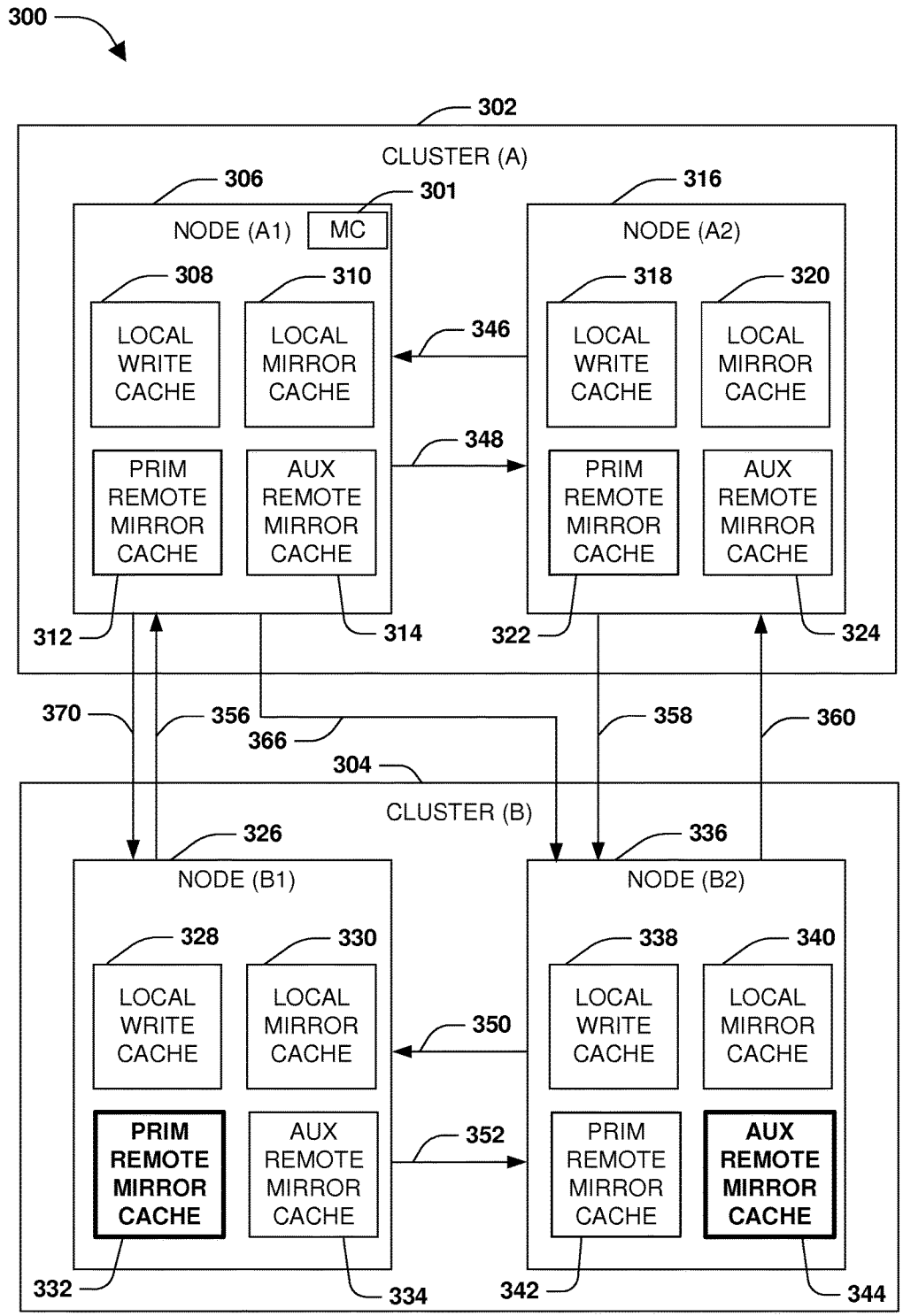
FIG. 3E is an example of a system for dynamic mirroring, where a storage node mirrors write caching data over both an auxiliary mirroring logical pipeline and a primary mirroring logical pipeline during a mirroring synchronization phase.

FIG. 3E illustrates the storage node (B1) 326 reviving into an operational state. The storage node (A1) 306 may receive a second notification that the storage node (B1) 326 has revived. The mirroring component 301 may establish a primary mirroring logical pipeline 370 between the storage node (A1) 306 and the storage node (B1) 326 based upon the primary disaster recovery partnership between the storage node (A1) 306 and the storage node (B1) 326. The mirroring component 301 may mirror, over the primary mirroring logical pipeline 370, write cache data from the storage node (A1) 306 (e.g., from the local write cache partition 308 of the storage node (A1) 306) to the third primary remote mirroring write cache partition 332 of the storage node (B1) 326.

Figure 3F:
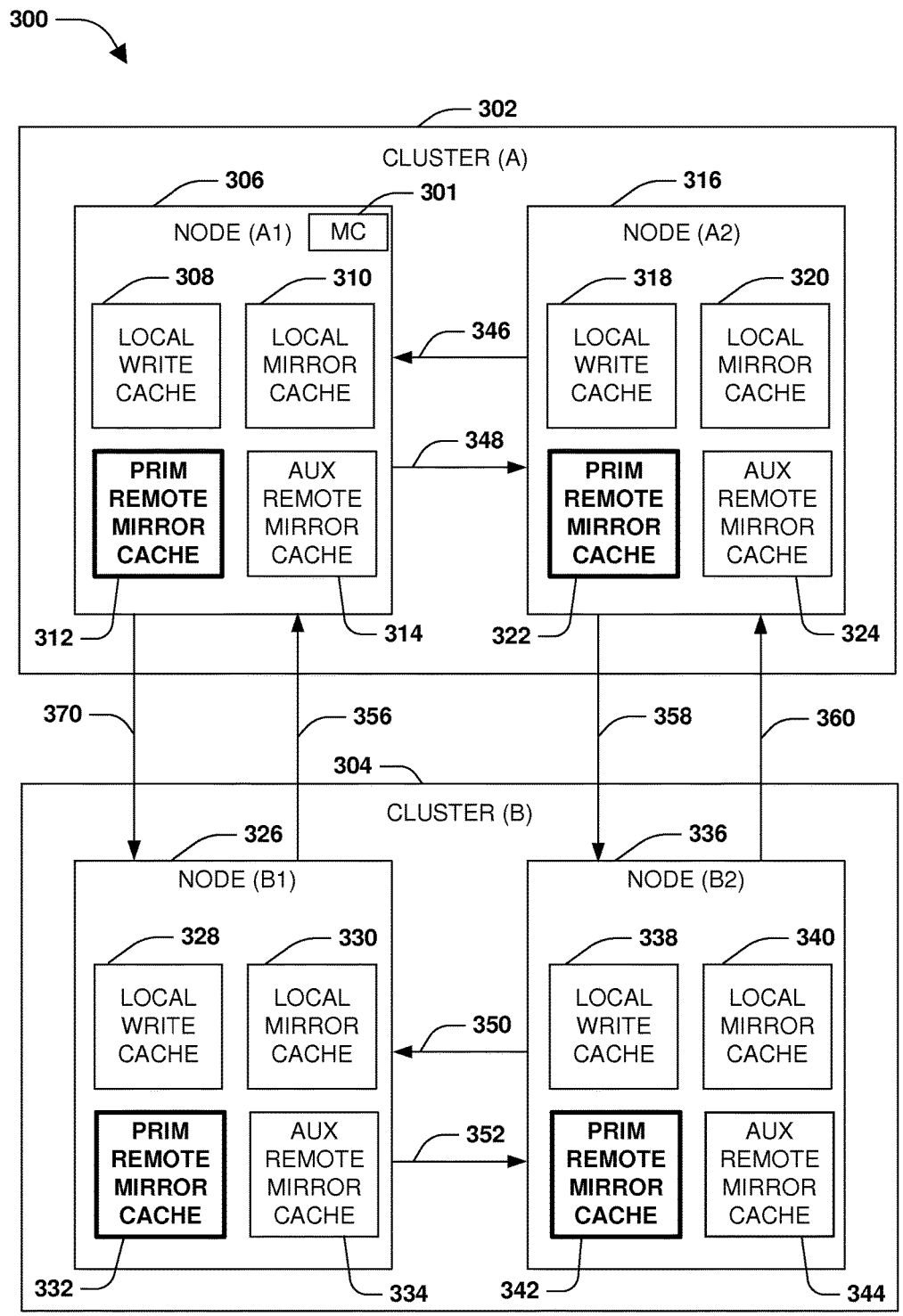
FIG. 3F is an example of a system for dynamic mirroring, where an auxiliary mirroring logical pipeline is terminated.

In an example, the mirroring component 301 may write (e.g., contemporaneously) the write caching data over both the auxiliary mirroring logical pipeline 366 to the storage node (B2) 336 and the primary mirroring logical pipeline 370 to the storage node (B1) 326 during a mirroring synchronization phase until the third primary remote mirroring write cache partition 332 is synchronized with the fourth auxiliary remote mirroring write cache partition 344 (e.g., in the event a disaster occurred at the storage cluster (A) 302 before the primary remote mirroring write cache partition 332 is up-to-date with write caching data mirrored by the storage node (A1) 306, the storage node (B2) 336 may have up-to-date data from the storage node (A1) 306). Responsive to synchronization of the third primary remote mirroring write cache partition 332 and the fourth auxiliary remote mirroring write cache partition 344, the mirroring component 301 may terminate the auxiliary mirroring logical pipeline 370, as illustrated in FIG. 3F where storage nodes are operating in the steady operational state such that storage nodes are mirroring data to primary disaster recovery partners as opposed to auxiliary disaster recovery partners.

Figure 3G:
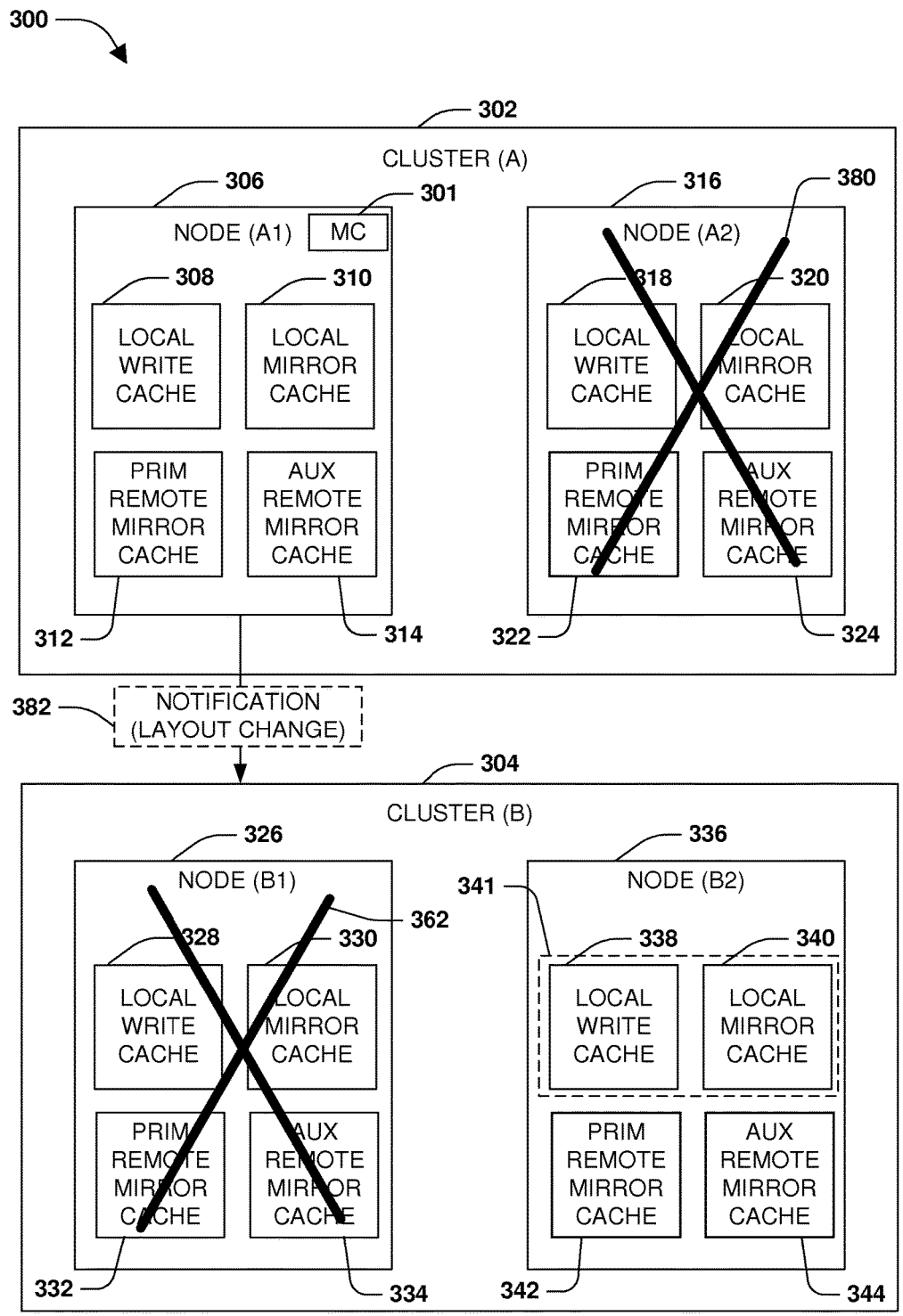
FIG. 3G is an example of a system for dynamic mirroring, where a local failover partner node and a primary disaster recovery storage node have failed.

FIG. 3G illustrates an example where the storage node (B1) 326 has failed, and the storage node (A1) 306 has detected that the storage node (A2) 316 has failed 380. The storage node (A1) 306, as the local failover partner, may determine that the storage node (A2) 316 has failed 380. The storage node (A1) 306 may send a notification 382 (e.g., a write cache layout change by the storage node (A1) 306 to adjust for the failure 380 of the storage node (A2) 316) to the storage node (B2) 336 that the storage node (A2) 316 has failed 380. In an example where the storage node (B1) 326 previously failed, the fourth local write cache partition 338 and the fourth local mirroring write cache partition 340 may have been collapsed into the first collapsed partition 341.

Figure 3H:
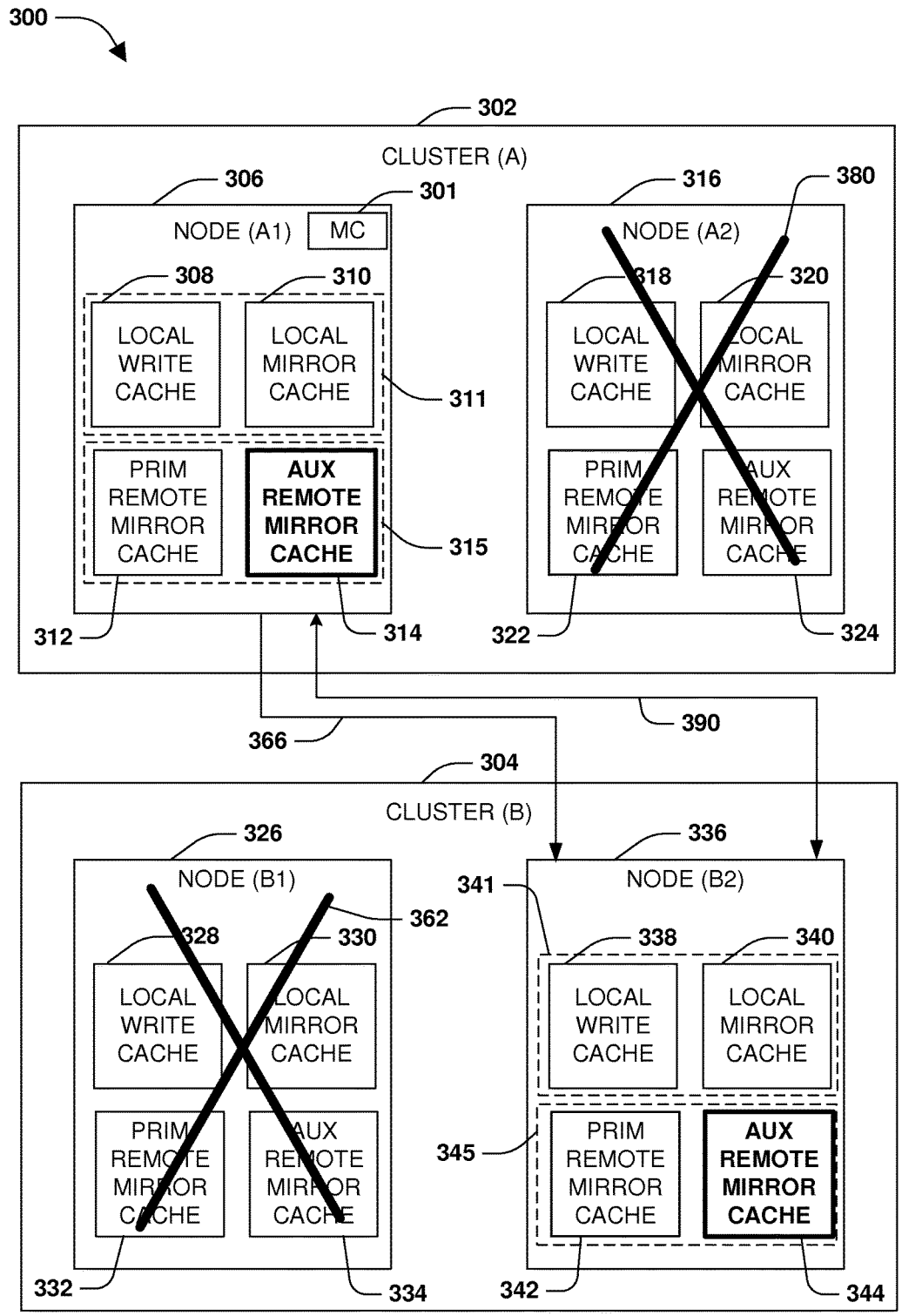
FIG. 3H is an example of a system for dynamic mirroring, where one or more auxiliary mirroring logical pipelines are established based upon a local failover partner node and a primary disaster recovery storage node failing.

FIG. 3H illustrates the mirroring component 301 establishing the auxiliary mirroring logical pipeline 366 between the storage node (A1) 306 and the storage node (B2) 336 based upon the auxiliary disaster recovery partnership between the storage node (A1) 306 and the storage node (B2) 336. In an example, the fourth primary remote mirroring cache partition 342 and the fourth auxiliary remote mirroring write cache partition 344 may be collapsed into a second collapsed partition 345. In an example, the local write cache partition 308 and the local mirroring write cache partition 310 may be collapsed into a third collapsed partition 311 and the primary remote mirroring cache partition 312 and the auxiliary remote mirroring write cache partition 314 may be collapsed into a fourth collapsed partition 315. Because the storage node (A1) 306 is unable to remotely mirror write cache data to the storage node (B1) 326 as the primary disaster recovery partner, the mirroring component 301 may mirror, over the auxiliary mirroring logical pipeline 366, write caching data from the storage node (A1) 306 (e.g., from the local write cache partition 308 of the storage node (A1) 306) to the fourth auxiliary remote mirroring write cache partition 344 of the storage node (B2) 336. Because the storage node (A2) 316, as the primary disaster recovery partner for the storage node (B2) 336, has failed 380, a second auxiliary mirroring logical pipeline 390 may be established between the storage node (A1) 306 and the storage node (B2) 336. Write caching data may be mirrored, over the second auxiliary mirroring logical pipeline 390, from the storage node (B2) 336 (e.g., from the fourth local write cache partition 338 of the storage node (B2) 336) to the auxiliary remote mirroring write cache partition 314 of the storage node (A1) 306. Thus, if storage node (A1) 306 or storage node (B2) 336 fails, the remaining storage node may utilize an auxiliary remote mirroring write cache partition for up-to-date information used to provide clients with access to data previously stored by the failed storage node.

Figure 4:
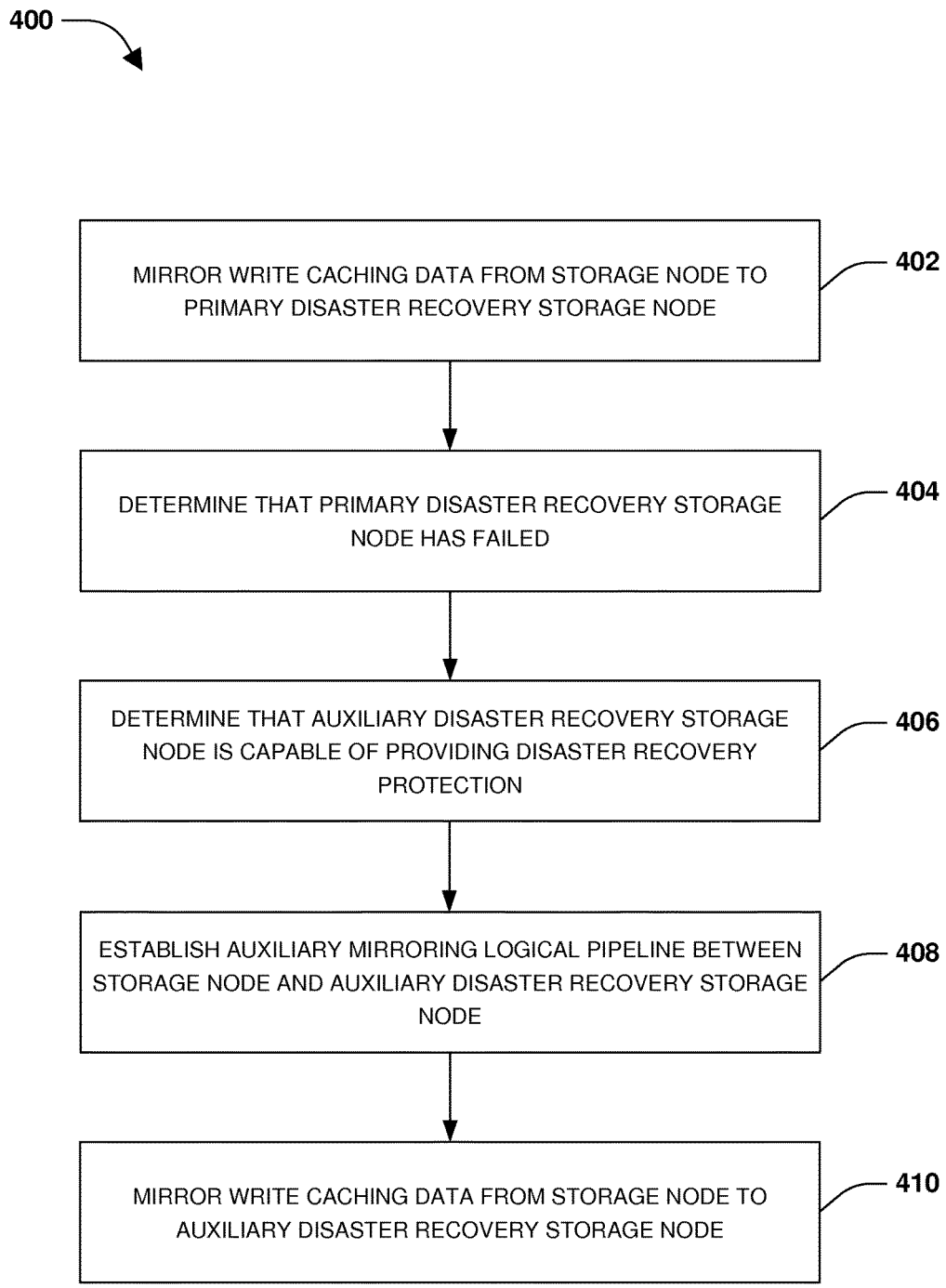
FIG. 4 is a flow chart illustrating an exemplary method of dynamic mirroring.

One embodiment of dynamic mirroring is illustrated by an exemplary method 400 of FIG. 4. At 402, write caching data may be mirrored from a storage node, within a first storage cluster, to a primary disaster recovery storage node, within a second storage cluster, as mirrored data based upon the storage node and the primary disaster recovery storage node having a primary disaster recovery partnership. At 404, the primary disaster recovery storage node may be determined as having failed. At 406, an auxiliary disaster recovery storage node, within the second storage cluster, may be determined as being capable of providing disaster recovery protection for the storage node based upon the storage node and the auxiliary disaster recovery storage node having an auxiliary disaster recovery partnership. At 408, an auxiliary mirroring logical pipeline may be established between the storage node and the auxiliary disaster recovery storage node. At 410, the write caching data may be mirrored from the storage node to the auxiliary disaster recovery storage node over the auxiliary mirroring logical pipeline as second mirrored data.

In an example, a second notification may be received that the primary disaster recovery storage node has revived into an operational state. The primary mirroring logical pipeline may be reestablished between the storage node and the primary disaster recovery storage node based upon the primary disaster recovery partnership. Write caching data may be mirrored from the storage node to the primary disaster recovery storage node over the primary mirroring logical pipeline. In an example, the write caching data may be mirrored over both the auxiliary mirroring logical pipeline and the primary mirroring logical pipeline during a mirroring synchronization phase. Responsive to a primary remote mirroring write cache partition of the primary disaster recovery storage node being synchronized with an auxiliary remote mirroring write cache partition of the auxiliary disaster recovery storage node, the auxiliary mirroring logical pipeline may be terminated.

In an example, the mirrored data may correspond to local I/O operation cache data stored within a local write cache partition of the storage node. A second storage node (e.g., a storage node having a local failover partnership with the storage node), within the first storage cluster, may be determined as having failed. Local mirrored data (e.g., data previously mirrored from the second storage node to the storage node based upon the local failover partnership) may be mirrored from within a local mirroring write cache partition of the storage node to the auxiliary disaster recovery partner as second mirrored data. In this way, data may be mirrored between storage nodes to improve data loss protection.

Figure 5:
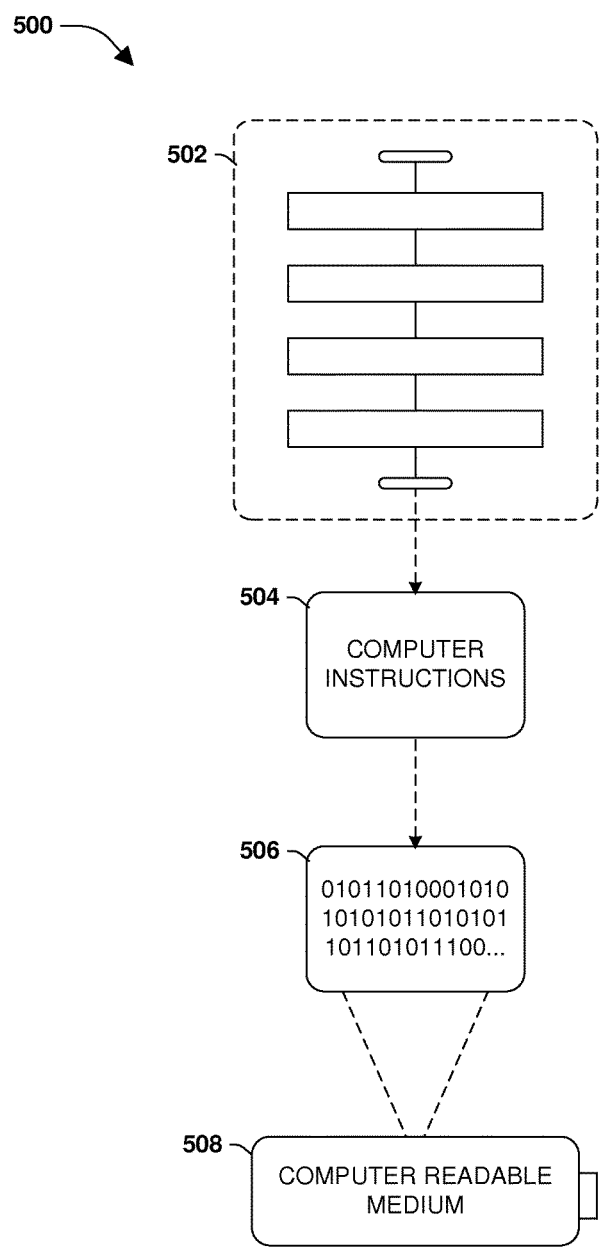
FIG. 5 is an example of a computer readable medium in accordance with one or more of the provisions set forth herein.

Still another embodiment involves a computer-readable medium comprising processor-executable instructions configured to implement one or more of the techniques presented herein. An example embodiment of a computer-readable medium or a computer-readable device that is devised in these ways is illustrated in FIG. 5, wherein the implementation 500 comprises a computer-readable medium 508, such as a CD-R, DVD-R, flash drive, a platter of a hard disk drive, etc., on which is encoded computer-readable data 506. This computer-readable data 506, such as binary data comprising at least one of a zero or a one, in turn comprises a set of computer instructions 504 configured to operate according to one or more of the principles set forth herein. In some embodiments, the processor-executable computer instructions 504 are configured to perform a method 502, such as at least some of the exemplary method 400 of FIG. 4, for example. In some embodiments, the processor-executable instructions 504 are configured to implement a system, such as at least some of the exemplary system 300 of FIGS. 3A-3H, for example. Many such computer-readable media are contemplated to operate in accordance with the techniques presented herein.

It will be appreciated that processes, architectures and/or procedures described herein can be implemented in hardware, firmware and/or software. It will also be appreciated that the provisions set forth herein may apply to any type of special-purpose computer (e.g., file host, storage server and/or storage serving appliance) and/or general-purpose computer, including a standalone computer or portion thereof, embodied as or including a storage system. Moreover, the teachings herein can be configured to a variety of storage system architectures including, but not limited to, a network-attached storage environment and/or a storage area network and disk assembly directly attached to a client or host computer. Storage system should therefore be taken broadly to include such arrangements in addition to any subsystems configured to perform a storage function and associated with other equipment or systems.

In some embodiments, methods described and/or illustrated in this disclosure may be realized in whole or in part on computer-readable media. Computer readable media can include processor-executable instructions configured to implement one or more of the methods presented herein, and may include any mechanism for storing this data that can be thereafter read by a computer system. Examples of computer readable media include (hard) drives (e.g., accessible via network attached storage (NAS)), Storage Area Networks (SAN), volatile and non-volatile memory, such as read-only memory (ROM), random-access memory (RAM), EEPROM and/or flash memory, CD-ROMs, CD-Rs, CD-RWs, DVDs, cassettes, magnetic tape, magnetic disk storage, optical or non-optical data storage devices and/or any other medium which can be used to store data.

Although the subject matter has been described in language specific to structural features or methodological acts, it is to be understood that the subject matter defined in the appended claims is not necessarily limited to the specific features or acts described above. Rather, the specific features and acts described above are disclosed as example forms of implementing at least some of the claims.

Various operations of embodiments are provided herein. The order in which some or all of the operations are described should not be construed to imply that these operations are necessarily order dependent. Alternative ordering will be appreciated given the benefit of this description. Further, it will be understood that not all operations are necessarily present in each embodiment provided herein. Also, it will be understood that not all operations are necessary in some embodiments.

Furthermore, the claimed subject matter is implemented as a method, apparatus, or article of manufacture using standard programming or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

As used in this application, the terms "component", "module," "system", "interface", and the like are generally intended to refer to a computer-related entity, either hardware, a combination of hardware and software, software, or software in execution. For example, a component includes a process running on a processor, a processor, an object, an executable, a thread of execution, a program, or a computer. By way of illustration, both an application running on a controller and the controller can be a component. One or more components residing within a process or thread of execution and a component may be localized on one computer or distributed between two or more computers.

Moreover, "exemplary" is used herein to mean serving as an example, instance, illustration, etc., and not necessarily as advantageous. As used in this application, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B and/or both A and B. Furthermore, to the extent that "includes", "having", "has", "with", or variants thereof are used, such terms are intended to be inclusive in a manner similar to the term "comprising".

Many modifications may be made to the instant disclosure without departing from the scope or spirit of the claimed subject matter. Unless specified otherwise, "first," "second," or the like are not intended to imply a temporal aspect, a spatial aspect, an ordering, etc. Rather, such terms are merely used as identifiers, names, etc. for features, elements, items, etc. For example, a first set of information and a second set of information generally correspond to set of information A and set of information B or two different or two identical sets of information or the same set of information.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A computing device comprising:
   a memory containing computer readable medium comprising executable code; and
   a processor coupled to the memory, the processor configured to execute the executable code to cause the processor to:
   maintain, at a first node of a first cluster, a local write cache partition for caching local I/O operation cache data processed by the first node, wherein the first node has a local failover partnership with a second node within the first cluster, a primary disaster recovery partnership with a third node of a second cluster, and an auxiliary disaster recovery partnership with a fourth node of the second cluster;
   maintain, at the first node, a local mirroring write cache partition for storing local mirrored data from the second node based upon the local failover partnership;
   maintain, at the first node, a primary remote mirroring write cache partition for storing primary mirrored data from the third node based upon the primary disaster recovery partnership; and
   maintain, at the first node, an auxiliary remote mirroring write cache partition for storing auxiliary mirrored data from the fourth node based upon the auxiliary disaster recovery partnership, wherein the auxiliary remote mirroring write cache partition is used to establish an auxiliary mirroring logical pipeline between the first node and the fourth node based upon the third node failing.

2. The computing device of claim 1, wherein the executable code causes the processor to:
   actively store the local I/O operation data within the local write cache partition;
   actively store the local mirrored data within the local mirroring write cache partition;
   actively store the primary mirrored data within the primary remote mirroring write cache partition; and
   passively maintain the auxiliary remote mirroring write cache partition.

3. The computing device of claim 1, wherein the executable code causes the processor to:
   locally mirror write caching data to the second node for storage within a second local mirroring write cache partition of the second node; and
   remotely mirror the write caching data to the third node for storage within a second primary remote mirroring write cache partition of the third node.

4. The computing device of claim 1, wherein the executable code causes the processor to:
   receive a notification from the fourth node that the third node failed;
   establish the auxiliary mirroring logical pipeline between the first node and the fourth node based upon the auxiliary disaster recovery partnership; and
   mirror write caching data from the first node to the fourth node over the auxiliary mirroring logical pipeline as mirrored data.

5. The computing device of claim 4, the mirrored data stored within a second auxiliary remote mirroring write cache partition of the fourth node.

6. The computing device of claim 5, wherein the mirrored data corresponds to the local I/O operation cache data stored within the local write cache partition, and wherein the executable code causes the processor to:
   determine that the second node failed; and
   mirror the local mirrored data from within the local mirroring write cache partition to the fourth node as second mirrored data.

7. The computing device of claim 6, the second mirrored data stored within a second primary remote mirroring write cache partition of the fourth node.

8. The computing device of claim 4, the notification corresponding to a write cache layout change of the fourth node.

9. The computing device of claim 4, wherein the executable code causes the processor to:

receive a second notification that the third node has revived into an operational state;

establish a primary mirroring logical pipeline between the first node and the third node based upon the primary disaster recovery partnership; and mirror the write caching data from the first node to the third node over the primary mirroring logical pipeline as second mirrored data.

10. The computing device of claim 9, the second mirrored data stored within a second primary remote mirroring write cache partition of the third node.

11. The computing device of claim 9, wherein the executable code causes the processor to:

mirror the write caching data over both the auxiliary mirroring logical pipeline and the primary mirroring logical pipeline during a mirroring synchronization phase.

12. The computing device of claim 11, wherein the executable code causes the processor to:

terminate the auxiliary mirroring logical pipeline based upon a second primary remote mirroring write cache partition of the third node being synchronized with a second auxiliary remote mirroring write cache partition of the fourth node.

13. A method for dynamic mirroring, comprising:

mirroring write caching data from a node, within a first cluster, to a primary disaster recovery node, within a second cluster, as mirrored data based upon the node and the primary disaster recovery node having a primary disaster recovery partnership;

determining that the primary disaster recovery node has failed;

determining that an auxiliary disaster recovery node, within the second cluster, is capable of providing disaster recovery protection for the node based upon the node and the auxiliary disaster recovery node having an auxiliary disaster recovery partnership;

establishing an auxiliary mirroring logical pipeline between the node and the auxiliary disaster recovery node based upon the primary disaster recovery node failing; and mirroring the write caching data from the node to the auxiliary disaster recovery node over the auxiliary mirroring logical pipeline as second mirrored data.

14. The method of claim 13, comprising:

receiving a second notification that the primary disaster recovery node has revived into an operational state;

reestablishing the primary mirroring logical pipeline between the node and the primary disaster recovery node based upon the primary disaster recovery partnership; and mirroring the write caching data from the node to the primary disaster recovery node over the primary mirroring logical pipeline.

15. The method of claim 14, comprising:

mirroring the write caching data over both the auxiliary mirroring logical pipeline and the primary mirroring logical pipeline during a mirroring synchronization phase.

16. The method of claim 15, comprising:

terminating the auxiliary mirroring logical pipeline based upon a primary remote mirroring write cache partition of the primary disaster recovery node being synchronized with an auxiliary remote mirroring write cache partition of the auxiliary disaster recovery node.

17. The method of claim 13, the mirrored data corresponding to local I/O operation cache data stored within a local write cache partition of the node, and the method comprising:

determining that a second node, within the first cluster, failed; and mirroring local mirrored data from within a local mirroring write cache partition of the node to the auxiliary disaster recovery partner as second mirrored data.

18. A non-transitory computer readable medium having stored thereon executable code which when executed by a computer causes the computer to:

mirror write caching data from a node, within a first cluster, to a primary disaster recovery node, within a second cluster, based upon the node and the primary disaster recovery node having a primary disaster recovery partnership;

determine that the primary disaster recovery node has failed;

determine that an auxiliary disaster recovery node, within the second cluster, is capable of providing disaster recovery protection for the node based upon the node and the auxiliary disaster recovery node having an auxiliary disaster recovery partnership;

establish an auxiliary mirroring logical pipeline between the node and the auxiliary disaster recovery node based upon the primary disaster recovery node failing; and mirror the write caching data from the node to the auxiliary disaster recovery node over the auxiliary mirroring logical pipeline as second mirrored data.

19. The non-transitory computer readable medium of claim 18, wherein the executable code cases the computer to:

receive a second notification that the primary disaster recovery node has revived into an operational state;

reestablish the primary mirroring logical pipeline between the node and the primary disaster recovery node based upon the primary disaster recovery partnership;

mirror the write caching data from the node to the primary disaster recovery node over the primary mirroring logical pipeline; and mirror the write caching data over both the auxiliary mirroring logical pipeline and the primary mirroring logical pipeline during a mirroring synchronization phase.

20. The system of claim 18, the mirrored data corresponding to local I/O operation cache data stored within a local write cache partition of the node, wherein the executable code cases the computer to:

determine that a second node, within the first cluster, failed; and mirror local mirrored data from within a local mirroring write cache partition of the node to the auxiliary disaster recovery partner as second mirrored data.

* * * * *

UNITED STATES PATENT AND TRADEMARK OFFICE
CERTIFICATE OF CORRECTION

PATENT NO. : 9,760,458 B2  
APPLICATION NO. : 14/800108  
DATED : September 12, 2017  
INVENTOR(S) : Hrishikesh Keremane Page 1 of 1

It is certified that error appears in the above-identified patent and that said Letters Patent is hereby corrected as shown below:

In the Claims

Column 18, Line 37 Claim 19: Delete the word "cases" and replace with the word --causes--

Column 18, Line 54 Claim 20: Delete the word "cases" and replace with the word --causes--

Signed and Sealed this  
Twenty-eighth Day of November, 2017

Joseph Matal  
*Performing the Functions and Duties of the*  
*Under Secretary of Commerce for Intellectual Property and*  
*Director of the United States Patent and Trademark Office*